May 19, 1964 P. M. ALLEN 3,133,346
METHOD FOR BONDING METALS
Filed June 2, 1961
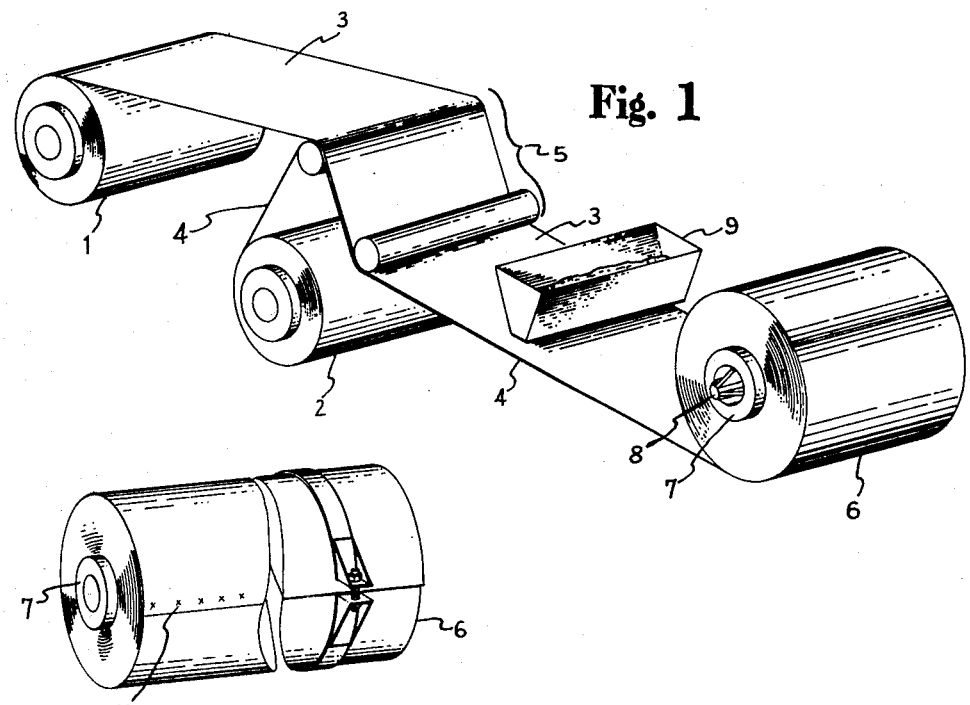
Fig. 1
Fig. 2
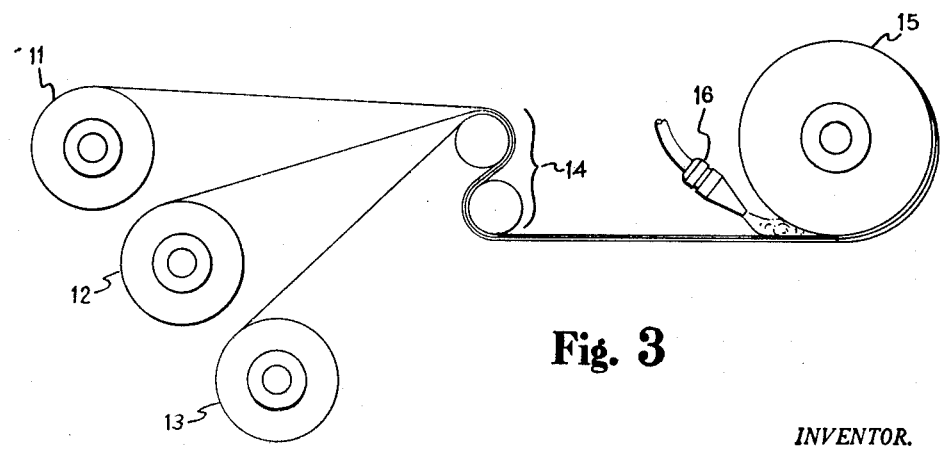
Fig. 3
INVENTOR.
PAUL M. ALLEN,
BY
*Allen & Allen*
ATTORNEYS.

United States Patent Office 3,133,346
Patented May 19, 1964

3,133,346
METHOD FOR BONDING METALS
Paul M. Allen, Middletown, Ohio, assignor to Armco Steel Corporation, Middletown, Ohio, a corporation of Ohio
Filed June 2, 1961, Ser. No. 114,435
13 Claims. (Cl. 29—470.9)

The instant invention relates to a method for bonding together two or more strips of metal, and has to do primarily with the manufacture of stainless clad steel, although from the outset it is to be understood that the procedures of the instant invention may be applied to the bonding together of other composite sheets formed from two or more strips of metal.

Various methods have hitherto been proposed for joining together two or more metals, as where stainless steel is bonded to one or both surfaces of a less expensive mild steel. Many of these methods are fusion processes wherein one or more of the metals to be joined is heated to a liquid state to promote diffusion. For example, the metals being joined may be cast together or heated and formed under pressure to effect the bond; and in many instances, an intermediate metallic layer is introduced to facilitate the bonding mechanism. It has also been proposed to join two or more metals by welding, soldering or brazing; and thin coatings are often applied to another metal by electroplating, vaporizing, dipping or spraying.

In recent years solid phase bonding of some metals has been accomplished by applying extremely heavy pressures to the metals while they are at room temperature. However, it is recognized that generally both heat and pressure are required to promote inter-atomic union of the metals. For example, in one known method of solid phase bonding, the metallic strips to be joined are brought together and heated in a furnace to a temperature above the minimum recrystallization temperature of the metal having the lowest recrystallization temperature of the several metals being bonded, whereupon the heated composite strip is rolled in a rolling mill with a percentage reduction of about 13% or more to effect an initial bond between the metals. After rolling the material is coiled and then heated or sintered in a furnace to increase the over-all strength of the initial bond.

Several other methods have also been disclosed which include as an essential step a reduction in thickness by hot or cold rolling. It is also known that solid phase bonding of certain metals can be accomplished by the application of an external load to the sheet stock, as where the two sheets are clamped together and then heated.

In contrast to the foregoing, a principal object of the instant invention is the provision of a much less complicated and relatively low cost method for bonding together two or more metals by solid phase diffusion, which bonding technique is adaptable to production equipment ordinarily used in producing primary metals.

Another object of the instant invention is the provision of a bonding technique wherein diffusion bonding is effected by first interleaving and coiling under tension the two or more strips of metal to be joined, whereupon the tensioned coil is heated, preferably in a controlled atmosphere, to effect inter-atomic union of the metals in the absence of rolling thereof.

Still a further object of the instant invention is the provision of a method for bonding together a great variety of metals in strip form, which method does not require the heating of the metals during the initial engagement thereof, nor the use of rolling equipment during any stage of the bonding operation.

Still another object of the instant invention is to bond and anneal strip metals simultaneously and without the necessity for the application of external pressure either during or after the bonding and annealing treatment.

The foregoing, together with other objects of the instant invention which will appear hereinafter or which will be apparent to the skilled worker in the art upon reading this specification, I accomplish by the method and procedures of which I shall now describe certain exemplary embodiments.

Reference is now made to the accompanying drawings wherein:

FIGURE 1 is a perspective view illustrating the coiling under tension of two strips of metal to be bonded, including the application of a stop-off agent or parting compound to the material being coiled.

FIGURE 2 is a perspective view illustrating a tensioned coil ready for heat treatment.

FIGURE 3 is a schematic view illustrating an alternative embodiment of the instant invention wherein three strips of material are formed into a tensioned coil and wherein the stop-off substance is sprayed on the upper surface of the composite strip as it is being coiled.

Briefly, in the practice of the instant invention two or more metal strips to be bonded together are wound into a single coil while each of the strips is under sufficient tension to cause intimate contact between the surfaces to be bonded. The composite coil is then welded or banded, or both, so as to retain it in the tensioned condition; whereupon the coil is placed in a box annealing furnace of any known design and heated, preferably in a non-oxidizing or a reducing atmosphere, to a temperature below the melting point of the metal in the coil having the lowest melting point.

It has been found that the instant procedures produce a bond between the strips being joined which is strong enough to permit the bonded materials to be formed into any shape consistent with the drawing properties of the individual metals, when similarly processed, without separation of the metals. When steel is joined to steel of the same or another composition, it has been found that no special surface preparation of the strips is required—which preparation has been a primary difficulty in prior art practices wherein meticulous care had to be taken to maintain the surfaces being joined in absolutely clean condition. Hot rolled steel must, of course, be pickled prior to bonding; while cold rolled steel must be cleaned to remove rolling oil and other contaminants and loose material from the surfaces. However, neither abrasion nor plating with another metal is necessary to effect the bond. However, if one of the metals is copper, it is advantageous to use the special grade of oxygen-free copper.

It will be recognized by those skilled in the art that the most frequent problem encountered in a cladding operation is the elimination of the oxides or oxide-forming constituents between the metals to be joined. Yet in the practice of the instant invention this problem is minimized. For example, stainless steel and other metals from oxides on exposure to air which surprisingly do not require removal before the bonding treatment if the oxides are not too heavy. It is, of course, impossible to state exactly how much oxide may be present on the steels, although obviously an oxide layer visible to the naked eye is not feasible. In general, either pickled or cold rolled steel surfaces may be protected from excessive oxidation for several days, if they are oiled. These surfaces are adeqautely prepared for bonding by a simple degreasing operation prior to or during the forming of the composite coil. In the case of aluminum, it has been found that the oxide layer will prevent adequate bonding unless it is broken up or removed, as by wire brushing. The atmosphere employed during the heating or annealing step also will be a factor bearing upon the degree of contamination of the strip surface which may be tolerated. If a reducing atmosphere such as hydrogen is employed, most oxides will be removed to some degree. However, if the heating is conducted in an inert atmosphere, the oxide tolerance will be lessened.

The method of the instant invention has special utility in cladding the less expensive metals with more expensive metals which have superior surface properties, such as the bonding of stainless steel to mild steel. The process is also highly useful in bonding three ply metals wherein the core metal has superior heat or electric conductivity. For example, stainless steel strips may be bonded to both sides of a copper or steel core strip. In general, the invention is applicable to ferrous metals, copper, nickel, cobalt, aluminum, tin, zinc, titanium, and alloys of these metals; and even to the refractory metals, including vanadium, tungsten, molybdenum, tantalum, columbium, and their alloys. In the case of some of these metals and their alloys, the pre-cleaning and heat treating atmospheres have to be carefully controlled to avoid undue oxidation.

Referring now to FIGURE 1 of the drawing, the reference characters 1 and 2 designate coils of the two metals which are to be joined. It will be understood that the coils 1 and 2 will be mounted on conventional decoilers provided with suitable brake means or other device capable of providing back tension. The strips 3 and 4 are unwound from the coils 1 and 2, and the two strips are brought together and juxtaposed in face-to-face relation by being passed through a set of guide rolls 5. Upon passage through the guide rolls, the juxtaposed strips are wound into a coil 6, the coil being formed on a sleeve 7 supported by the mandrel 8 of a coiler capable of coiling under high tension.

In order to prevent the convolutions of the composite strip from adhering to each other when formed into the coil 6, a hopper 9 is provided immediately in advance of the coil 6, which hopper acts to deposit a stop-off material on one surface of the composite strip, such stop-off material acting to effectively prevent bonding of adjacent laps or convolutions of the composite coil. For this purpose any material which does not melt or react with the metals to be bonded may be used. It has been found that alumina, magnesia, or silica in the form of a dry powder provide a highly effective stop-off agent when deposited on the strip in the form of an essentially thin layer. It will be understood, of course, that other finely divided substances, or even thin strips of inert material, may be used to effectively separate the convolutions of the composite strip to prevent them from adhering.

The tension under which the composite strip is wound into the coil 6 is important to the successful practice of the invention. As has already been indicated, the tension usually is well above that normally employed for conventional coiling operations. However, as can be appreciated, the lower limit of tension will vary with the metals being acted upon and their characteristics. For example, in bonding steel and copper to stainless steel, it has been found that the tension should be at least 2000 lbs. per square inch (p.s.i.). In other words, if the strip is 30 inches wide and 0.01 inch thick, a tensile load of at least 600 lbs. is required in coiling the strip. If the same width strip is 0.09 inch thick, the tension should be at least 5400 lbs. It is not necessary, however, that each of the strips being wound into a given coil be subjected to the same tension. In addition, it is preferred to use a relatively greater tension where thicker strips are being joined in order to cause them to conform more closely to each other. Needless to say, strip shape is extremely important since no bonding will occur where the mating surfaces of the strips are not in intimate contact with each other.

The upper practical limit of tension appears to be at or slightly above the yield strength of the metals being bonded, and in some instances tensions in excess of the yield strength will be found to increase the flatness of the strips being joined. In fact, it appears that the bonding efficiency of the metals will increase as the tension is increased up to the ultimate strength of the metals, which is their tearing or breaking strength. However, for most purposes such extremely high tensions are not required; and if employed, introduce additional problems such as necking and non-uniform thickness of the composite strip. As already indicated, the strips being coiled need not be under the same tension and the differences in tension between them may vary widely, as where one of the strips is plastically stretched while another strip in the same coil is elastically stretched.

In forming the tensioned coil 6, the coil is preferably wound on a metallic sleeve 7 which is sufficiently rigid to withstand the compressive forces exerted against it by the tensioned coil. When one of the metals is mild steel, a stainless steel sleeve has been found to be highly suited for the purpose; and the leading end of the composite strip may be fixedly secured to the sleeve either by inserting it in a slot in the sleeve, by first forming a few laps under low tension, or by welding the leading edge of the composite strip to the sleeve structure. It is also necessary to fixedly secure the trailing end of the composite strip making up the coil; and this can be readily done by spot welding, as illustrated at 10 in FIGURE 2, thereby maintaining the coil under tension. As will be explained more fully hereinafter, the subsequent heating of the coil while maintained under tension and supported on the sleeve 7 acts to apply pressure normal to the cladding surfaces.

The heat treatment of the tensioned coil may be carried out in most types of furnaces, although it is preferred to employ a furnace capable of holding a low dew point. Alternatively, a vacuum furnace could be employed.

The heat treating temperature should be above the recrystallization temperature of at least one of the metals but below the melting point of the lowest melting point metal or alloy of the coil. In the event one or more of the metals or alloys is in the annealed condition, it is to be understood that as to any such annealed metal or alloy the term recrystallization temperature will mean the temperature at which such metal or alloy would recrystallize if it were in the stressed condition. Inasmuch as the diffusion rate increases with temperature, the highest temperatures within the permissible range reduce the time necessary for thorough bonding. Lower temperatures may be used when time is not a major factor. When the heat treatment also serves to anneal the metals, the maximum bonding temperature will be limited by the optimum annealing temperature for the particular metals being bonded, and the time at temperature will be adjusted accordingly. In addition, and as will be understood by the skilled worker in the art, since the grain sizes of the metals and other metallurgical properties vary with the temperature, the temperature employed will be selected to insure the development of the desired properties of the composite strip.

In working with some metals, it has been found that the bonding temperature will exceed the preferred annealing temperature. For example, in bonding stainless steel to a mild steel, the bonding temperature may range from about 1800° F. to about 2400° F. but, because of metallurgical factors such as grain coarsening as well as the practical operating temperatures of most furnaces, the preferred range is about 1800° F. to about 2100° F. For bonding stainless steel and copper, the temperature range should be from about 1800° F. to about 1950° F. Generally speaking, the bonding temperature will be the lowest temperature consistent with good adherence and good metallurgical properties.

The time at temperature may vary from less than one hour to twenty-four hours or longer, again depending upon the metals being joined and the temperature of the heat treatment.

The heat treatment is conducted in a vacuum or in an atmosphere which is non-oxidizing at the bonding temperature. However, when a gas is used, it may be either reducing or inert with respect to the metals being bonded. Where one of the metals is stainless steel, the treatment is preferably conducted employing dry hydrogen in order to maintain the bright condition of the stainless steel. Hydrogen is preferred because it will also reduce the oxides of many metals. Helium or argon also may be employed. Where aluminum and titanium are involved, bonding may be done in vacuum, or lithium vapor may be added to the atmosphere; and in the case of copper, carbonaceous gases may be employed. The skilled worker in the art should have no difficulty in ascertaining other protective atmospheres acceptable for use in accordance with the teachings of the instant invention, the primary consideration being that the elements of the atmosphere will not react adversely with the metals being bonded.

Subsequent to the heat treating of the coil, the now bonded composite strip will be cooled, uncoiled and the stop-off material removed. Where the stop-off material is a finely divided substance, such as alumina, it can be effectively removed by mechanical action, as by brushing, either wet or dry. In the case of stainless clad steel it is preferred to cool the coil in the furnace under controlled conditions in order to maintain the bright condition of the stainless surface. Such coil could be cooled in air, if so desired, in which event it would normally be subjected to a pickling treatment following unwinding and removal of the stop-off agent. In any event, subsequent to the removal of the alumina or other stop-off agent, the processing of the bonded strip, if additional processing is required, will be conventional. For example, if the bonded material is stainless clad steel, subsequent processing will be conventional stainless processing, inclusive of heat treatments and reduction to lighter gauge.

While not wishing to be bound by theory, it is believed that the success of the instant method of bonding is due in part to the slight relative movement between the mating surfaces of the strips being joined caused by differences in their coefficients of expansion, rates of creep, recrystallization temperatures, and phase changes where they exist. As already stated, the tensioning of the coil is extremely important in that it brings the mating surfaces into all-over tight union, and to this end a sleeve of stainless steel is preferred because it has a higher coefficient of expansion than most metals. The sleeve, when heated, expands radially against the innermost convolution of the coil, thereby increasing the tension which would otherwise be obtained in each of the strips at the bonding temperature.

The following examples are illustrative of bonding in accordance with the instant invention.

*Example 1.*—An annealed and pickled strip of low carbon steel .0175 inch thick was cold rolled to a thickness of .0146 inch. Oil was cleaned from the strip with solvent. This strip and a bright annealed strip of 18–8 stainless steel .002 inch thick was secured to a slotted 18–8 stainless steel sleeve. After about two revolutions of the coiler, the tension was increased to obtain a tension on the strips of about 2700 p.s.i. A slurry of magnesium oxide was applied to the top surface of the top strip just prior to forming the tensioned composite coil. The tensioned coil was tightly banded with stainless steel bands to maintain tension. The coil and sleeve were then inserted into the muffle of a furnace and the end of the muffle closed. The furnace was purged of air with nitrogen, after which dry hydrogen (dew point −40° F. or below) was introduced. The temperature of the coil was then raised to 1820° F. in 3½ hours, held for 1½ to 1¾ hours and the furnace then turned off. The coil was then cooled in the furnace in the dry hydrogen atmosphere.

*Example 2.*—The same procedure was followed as in Example 1, excepting in this instance an annealed and pickled strip of low carbon steel .0175 inch thick was cold rolled to a thickness of .0157 inch and joined with an annealed and pickled strip of 17% chromium stainless steel .005 inch thick.

*Example 3.*—A strip of about 99.9% pure copper was rolled from a thickness of .250 inch to .019 inch, and the oil was cleaned from the strip with solvent. This strip and a bright annealed strip of 18–8 stainless steel .002 inch thick were secured to a slotted 18–8 stainless steel sleeve. After about two revolutions of the coiler, the strips were coiled at a tension of about 3250 p.s.i. and subsequently banded. Dry alumina was spread on the top surface of the top strip as the coil was being formed. The coil and sleeve were then placed into a stainless muffle of the furnace and the end of the muffle closed; whereupon the furnace was purged of air in the manner set forth in Example 1. The coil was heated to a temperature of 1920° F. in 2¾ hours, held at temperature for about 2¼ hours, and subsequently cooled in the furnace.

The composite strips produced in accordance with the foregoing examples were all found to be tightly bonded and capable of withstanding severe deformation without separation. It also should be pointed out that while the low carbon steels and copper of the preceding examples were in the cold rolled condition prior to bonding, the procedures of the instant invention are equally applicable to such metals in their annealed state.

Modifications may, of course, be made in the invention without departing from its spirit and purpose. For example, it has already been indicated that the instant invention may be utilized to bond together three strips of metal. This is illustrated in FIGURE 3 of the drawings wherein the coils 11, 12 and 13 are unwound, joined together upon passage through the bridle rolls 14, and subsequently wound into a single tensioned coil 15. In this instance the stop-off material is either in the form of a slurry or a dry powder which is sprayed on the uppermost surface of the composite web by means of nozzles 16 extending transversely of the advancing webs. It is also within the spirit and purpose of the invention to insert a roller leveler and/or other flattening instrumentality between the decoilers and the coiler to obtain optimum conformance of the strips to one another prior to coiling. While not ordinarily required, it is also within the ambit of the invention to flash one or more of the strips being joined with another metal, such as nickel, to promote better adherence.

It is also within the ambit of the invention to effect radial expansion of the coil while being heated by means other than a supporting sleeve. For example, an expandable mandrel could be inserted in each of the coils at the time they are placed in the furnace and the mandrel expanded during heating to exert radially directed forces against the convolutions of the coil. Similarly, the coils could be confined against radial expansion by means of bands having a lower coefficient of expansion than at least one of the metals being bonded. It should be apparent that these expedients may be employed alone or in combination.

It is to be understood that the term "strip" as herein used means an elongated continuous web of any width and of any thickness limited only by its ability to be coiled under tension. Similarly, the term "metal" as used herein contemplates both the primary metals and their alloys alone or in combination.

Having thus described the invention in certain exemplary embodiments, what I desire to secure and protect by Letters Patent is:

1. A process for bonding together at least two strips of essentially flat metal capable of being joined by solid phase diffusion and capable of being tensioned, which comprises the steps of superposing the metallic strips and winding them onto a core under sufficient tension to bring the contacting surfaces of the strips into all over intimate contact, thereby forming a tensioned coil the convolutions of which are each composed of said superposed metallic strips, including the step of interposing a stop-off material between the convolutions of the coil, securing the coil in the tensioned condition, and thereafter heating the tensioned coil under non-oxidizing conditions and at a temperature which is above the recrystallization temperature of at least one of the metallic strips in the coil but below the melting point of the metallic strip in the coil having the lowest melting point, said coil being maintained at temperature for a time sufficient to effect solid phase bonding between the superposed strips, said length of time being on the order of from about one to twenty-four hours depending upon the temperature at which the coil is treated, the time at temperature varying inversely with the temperature, and thereafter cooling said coil.

2. A process for bonding together at least two strips of essentially flat metal capable of being joined by solid phase diffusion, at least one of said strips having an ultimate strength in excess of 2000 p.s.i., which comprises the steps of superposing the strips and winding them onto a core under tension, with the said one strip being under a tension of at least 2000 p.s.i., but in all cases less than the ultimate strengths of the strips, to thereby form a tensioned coil in which the convolutions are composed of said superposed strips, including the step of interposing a stop-off material between the convolutions of the coil, securing the coil in the tensioned condition, and thereafter heating the coil under non-oxidizing conditions to a temperature which is above the recrystallization temperature of at least one of the metallic strips in the coil but below the melting point of the metallic strip in the coil having the lowest melting point for from about one to twenty-four hours depending upon the temperature at which the coil is heated, the time at temperature varying inversely with the temperature, and thereafter cooling the coil.

3. The process claimed in claim 2 wherein one of the strips is stainless steel and another is mild steel and said temperature is from about 1800° F. to 2100° F.

4. The process claimed in claim 2 wherein one of the strips is stainless steel and another is copper and said temperature is from about 1800° F. to 1950° F.

5. The process claimed in claim 2 wherein said stop-off material comprises a finely divided substance such as alumina.

6. The process claimed in claim 2 wherein said heat treatment is conducted in a reducing atmosphere.

7. The process claimed in claim 6 wherein said reducing atmosphere comprises dry hydrogen.

8. A process for bonding together at least two essentially flat metallic strips capable of being joined by solid phase diffusion and each having an ultimate strength in excess of 2000 p.s.i. which comprises the steps of superposing said strips, as by passing said strips through guide rolls, thereby forming a composite strip, winding said composite strip onto a coiler provided with a coil receiving sleeve under a tension at the collar of at least 2000 p.s.i. but below the ultimate strength of the strip having the lowest ultimate strength, including the step of interposing a stop-off material between the convolutions of the coiled composite strip, securing the coiled composite strip in the tensioned conditioned, removing said sleeve and coiled composite strip thereon from the coiler, and thereafter heating said sleeve and the coiled composite strip under non-oxidizing conditions to a temperature above the recrystallization temperature of at least one of the strips but below the melting point of the strip having the lowest melting point, and maintaining said coiled composite strip at temperature for the length of time on the order of about one to twenty-four hours depending upon the temperature at which said coiled composite strip is heated, the time and temperature varying inversely with the temperature, and thereafter cooling the coiled composite strip and removing said sleeve.

9. The process claimed in claim 8 wherein said sleeve comprises a metallic sleeve having a higher coefficient of expansion than at least one of the strips in said coil.

10. The process claimed in claim 9 wherein said sleeve comprises stainless steel.

11. A process for the solid phase bonding of at least two essentially flat metallic strips capable of being joined by solid phased diffusion and each having an ultimate strength in excess of 2000 p.s.i. which comprises the steps of securing the leading ends of the strips to the sleeve of the coiler with the strips in superposed relationship, winding the strips onto the sleeve under a tension of at least 2000 p.s.i. but less than the ultimate strength of the strip having the lowest ultimate strength to thereby form a tensioned coil in which the convolutions are composed of said superposed strips, including the step of interposing a stoff-off material between each convolution of the coiled strips, securing the trailing ends of the strips when the coil has been formed to prevent relaxation of the tension in the coil, removing the sleeve and the coiled strips thereon from the coiler and thereafter heating them in a furnace under non-oxidizing conditions for from about one to twenty-four hours at a temperature which is above the recrystallization temperature of at least one of the strips in the coil but below the melting point of the metallic strip in the coil having the lowest melting point, the time at temperature varying inversely with the temperature, and thereafter cooling the coil, unwinding the strips and removing the sleeve.

12. The process claimed in claim 11 including the step of increasing the tension within the coil during the heating thereof by applying outwardly directed radial forces to the coil from within the center of the coil.

13. The process claimed in claim 11 including the step of restricting the expansion of the tensioned coil during heating by means of at least one confining band surrounding said coil, said band being composed of a material having a lower coefficient of expansion than at least one of the metallic strips making up said coil.

References Cited in the file of this patent

UNITED STATES PATENTS

| | | |
|---|---|---|
| 2,269,523 | Deutsch | Jan. 13, 1942 |
| 2,360,185 | Wrighton et al. | Oct. 10, 1944 |
| 2,371,348 | Murray | Mar. 13, 1945 |
| 2,731,713 | Schaefer | Jan. 24, 1956 |
| 2,744,314 | Kinney | May 8, 1956 |
| 2,834,102 | Pflumm et al. | May 13, 1958 |